United States Patent
Li (10) Patent No.: US 10,812,255 B2
(45) Date of Patent: Oct. 20, 2020

(54) SOFTWARE INTERFACE FOR SMART CONTRACTS

(71) Applicant: Alibaba Group Holding Limited, George Town (KY)

(72) Inventor: Yanpeng Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,371

(22) Filed: Sep. 30, 2019

(65) Prior Publication Data

US 2020/0287706 A1   Sep. 10, 2020

Related U.S. Application Data (63) Continuation of application No. PCT/CN2019/076887, filed on Mar. 4, 2019.

(51) Int. Cl.
*H04L 9/06* (2006.01)
*H04L 9/32* (2006.01)
(Continued)

(52) U.S. Cl.
CPC ........ *H04L 9/0637* (2013.01); *G06F 9/44526* (2013.01); *G06Q 10/00* (2013.01);
(Continued)

(58) Field of Classification Search
CPC . H04L 9/0637; H04L 9/3297; H04L 2209/38; G06F 9/44526; G06Q 10/00; G06Q 2220/00
See application file for complete search history.

(56) References Cited

U.S. PATENT DOCUMENTS

| 10,146,792 B1 | 12/2018 | Dobrek et al. |
| 2017/0232300 A1* | 8/2017 | Tran .................. G06F 3/017 434/247 |

(Continued)

FOREIGN PATENT DOCUMENTS

| CN | 106919419 | 7/2017 |
| CN | 107147704 | 9/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ayoub Alata
(74) *Attorney, Agent, or Firm* — Fish & Richardson P.C.

(57) ABSTRACT

Implementations of this specification include retrieving smart contract definitions from the blockchain network, the smart contract definitions including a plurality of contract functions from a plurality of smart contracts stored in a blockchain maintained by the blockchain network; generating a smart contract interface representing the smart contract definitions, the smart contract interface including a plurality of interface functions corresponding to the plurality of contract functions, the smart contract interface allowing software applications to call each of the contract functions by calling a corresponding interface function; receiving a call to a particular interface function from a software application, the call including call parameters; generating a smart contract call to the particular contract function including the call parameters; and transmitting the smart contract call to the blockchain network.

23 Claims, 5 Drawing Sheets

(51) Int. Cl.
*G06Q 10/00* (2012.01)
*G06F 9/445* (2018.01)
(52) U.S. Cl.
CPC ....... *H04L 9/3297* (2013.01); *G06Q 2220/00* (2013.01); *H04L 2209/38* (2013.01)

(56) References Cited

U.S. PATENT DOCUMENTS

| | | | |
|---|---|---|---|
| 2018/0078843 A1* | 3/2018 | Tran | A61B 5/6895 |
| 2018/0117446 A1* | 5/2018 | Tran | A61B 5/11 |
| 2018/0117447 A1* | 5/2018 | Tran | A42B 3/046 |
| 2018/0248880 A1* | 8/2018 | Sardesai | H04L 9/3297 |
| 2018/0227116 A1 | 9/2018 | Chapman et al. | |
| 2018/0293578 A1* | 10/2018 | Gardner | G06Q 20/382 |
| 2019/0057379 A1 | 2/2019 | Chalakudi et al. | |
| 2019/0058582 A1 | 2/2019 | Pathak et al. | |
| 2019/0102163 A1* | 4/2019 | Witherspoon | G07C 13/00 |
| 2019/0104196 A1* | 4/2019 | Li | G06F 16/1834 |
| 2019/0243912 A1* | 8/2019 | Duraisamy Soundrapandian | G06F 9/45558 |
| 2019/0303892 A1* | 10/2019 | Yantis | G06Q 10/10 |
| 2019/0303926 A1* | 10/2019 | Yantis | G06Q 40/025 |
| 2019/0361917 A1* | 11/2019 | Tran | G06Q 40/04 |

FOREIGN PATENT DOCUMENTS

| | | | |
|---|---|---|---|
| CN | 107274186 A * | 10/2017 | ......... G06Q 20/3825 |
| CN | 107688927 | 2/2018 | |
| CN | 108510389 | 9/2018 | |
| CN | 108765158 | 11/2018 | |
| WO | WO-2017153495 A1 * | 9/2017 | ......... G06Q 10/1053 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/076887, dated Dec. 6, 2019, 7 pages.

European Extended Search Report in European Appln. No. 19725889.0, dated May 14, 2020, 6 pages.

dravesness.me [online], "Simple Smart Contract—Call (3)—Faith Oriented Programming", May 9, 2018, Retrieved on Jun. 2, 2020, retreived from: <https://draveness.me/smart-contract-invoke/>, 14 pages [with English machine translation].

* cited by examiner

SOFTWARE INTERFACE FOR SMART CONTRACTS

CROSS-REFERENCE TO RELATED APPLICATIONS

This application is a continuation of PCT Application No. PCT/CN2019/076887, filed on Mar. 4, 2019, which is hereby incorporated by reference in its entirety.

TECHNICAL FIELD

This specification relates to providing a software interface for calling smart contracts.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A smart contract is a set of software instructions with a predefined set of rules for various parties on a blockchain network. Smart contracts are executed by the nodes of the blockchain network and sets the conditions under which all parties to the smart contract agree to interact with each other. Additionally, a smart contract can be executed if and when each conditions of the smart contract are met. Even though smart contracts mitigate the need for trusted third parties, executing the smart contract or one or more functions of the smart contract from a software application is a tedious, meticulous, and error-prone process. It would be desirable to allow developers of software applications to execute smart contract functions in a more transparent and less burdensome manner.

SUMMARY

Implementations of this specification include computer-implemented methods for providing a software interface for calling smart contracts. More particularly, implementations of this specification are directed to generating a simplified framework for smart contract calls. A blockchain structure is analyzed, and one or more software libraries are generated including functions corresponding to smart contracts stored in the blockchain. The functions are callable from software applications to initiate execution of the smart contract functionality, thereby greatly simplifying the process for accessing smart contract functionality from standard software applications.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Implementations of this specification include computer-implemented methods for smart contracts. More particularly, implementations of this specification are directed to generating a simplified framework for smart contract calls. In some implementations, actions include retrieving smart contract definitions from the blockchain network, the smart contract definitions including a plurality of contract functions from a plurality of smart contracts stored in a blockchain maintained by the blockchain network; generating a smart contract interface representing the smart contract definitions, the smart contract interface including a plurality of interface functions corresponding to the plurality of contract functions, the smart contract interface configured to allow software applications to call each of the contract functions by calling a corresponding interface function; receiving a call to a particular interface function from a software application, the call including call parameters corresponding to parameters of a particular contract function corresponding to the particular interface function; in response to the receiving the call to the particular interface function, generating a smart contract call to the particular contract function including the call parameters; transmitting the smart contract call to the blockchain network; and receiving results from an execution of the smart contract call by the blockchain network and providing the results to the software application.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, store data, and communicate with smart contracts. The term blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Examples of public blockchain networks include the cryptocurrency networks, which are peer-to-peer payment network. Cryptocurrency networks leverage a distributed ledger, referred to as blockchain. As noted above, the term blockchain, however, is used to generally refer to distributed ledgers without particular reference to a cryptocurrency network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Examples of consensus protocol includes, without limitation, proof-of-work (POW) implemented in cryptocurrency networks.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of this specification are described in further detail herein with reference to a public blockchain network, which is public among the participating entities. It is contemplated, however, that implementations of this specification can be realized in any appropriate type of blockchain network.

In some implementations, a blockchain network can include one or more smart contracts. Generally, a smart contract is a set of one or more computer instructions that are stored in a blockchain (as a smart contract definition) and executed by nodes of a blockchain network. The code for a smart contract is generally transformed into a form that is executable by the nodes of the blockchain network (e.g., bytecode) and either the bytecode itself or bytecode configured to retrieve the smart contract bytecode is stored in the blockchain. Functions defined in the smart contract code can then be called by participants in the blockchain network, causing nodes to execute the instructions in the called function. A "call" to a smart contract is a request to execute the smart contract by a participant in the blockchain network (e.g., a user, client, blockchain node, or other entity When a smart contract stored in a blockchain is called by a participant in the blockchain network, the blockchain network executes each instruction of the smart contract in a consensus fashion. For example, in response to a call to a smart contract, each node in the blockchain network executes a first instruction of the smart contract. The first node in the blockchain network that finishes executing the first instruction of the smart contract writes a result of the execution (e.g., an updated execution state for the smart contract) to the blockchain. The other nodes in the blockchain network can verify the result of the first node's execution of the first instruction. If the other nodes in the blockchain network verify the result of the first node's execution of the first instruction (e.g., the other nodes generate the same result from executing the first instruction), then each node proceeds to execute the second instruction of the smart contract. This process repeats until each instruction of the smart contract has been executed and verified.

As described below, this specification describes techniques for generating software libraries that allow smart contracts to be called during execution of a software program. In particular, the software libraries can be incorporated into a developer's application for the developer to invoke one or more corresponding smart contract calls as if the developer was invoking a local function call. For example, a smart contract call may look similar to "FunctionName (int 1, int 2, char "input," char "input2")." The software libraries can include function calls to execute the smart contract and function calls to execute one or more functions of the smart contract. As such, instead of the developer having to generate a network message that is to be transmitted across the network to execute a function of a smart contract or the smart contract itself on the blockchain network; the developer can simply generate a local call to a function in the software library that executes the smart contract on the blockchain network. The software library can convert the local call to a network call and transmit the network call to the blockchain network to execute a function of the smart contract. The functions incorporated in the software library can match the function definitions of the smart contract on the blockchain network.

This can be beneficial for the developer. The libraries (e.g., the smart contract interface) are generated based on the definition in the blockchain, and can be updated frequently or automatically in response to changes in the blockchain (e.g., new smart contracts being created). Thus, the libraries can be kept in sync with the state of the blockchain with minimal effort. In addition, by incorporating the software libraries that include the function calls for the smart contract and functions corresponding to smart contract into applications, the developer can invoke the functions of the software libraries for the smart contract and corresponding functions. The developer can make smart contract calls and smart contract function calls in his/her application as if the developer is making a local call.

In addition, when calls to smart contracts and functions of smart contracts are organized in the software libraries, a developer can quickly incorporate these software libraries in any application the developer desires. This gives the user flexibility in executing smart contracts on a blockchain network in a variety of applications.

Figure 1:
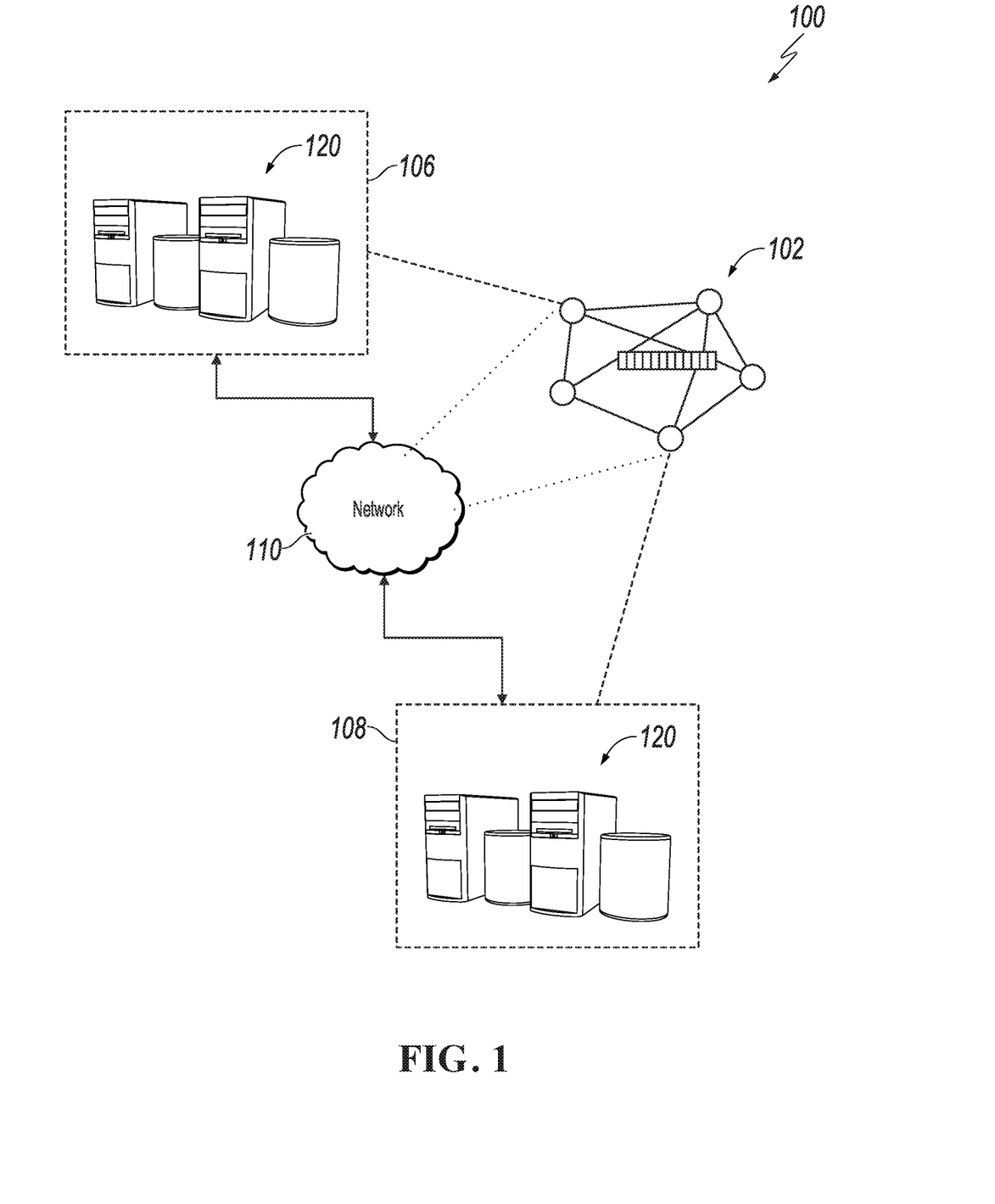
FIG. 1 depicts an example of an environment that can be used to execute implementations of this specification.

FIG. 1 depicts an example of an environment 100 that can be used to execute implementations of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
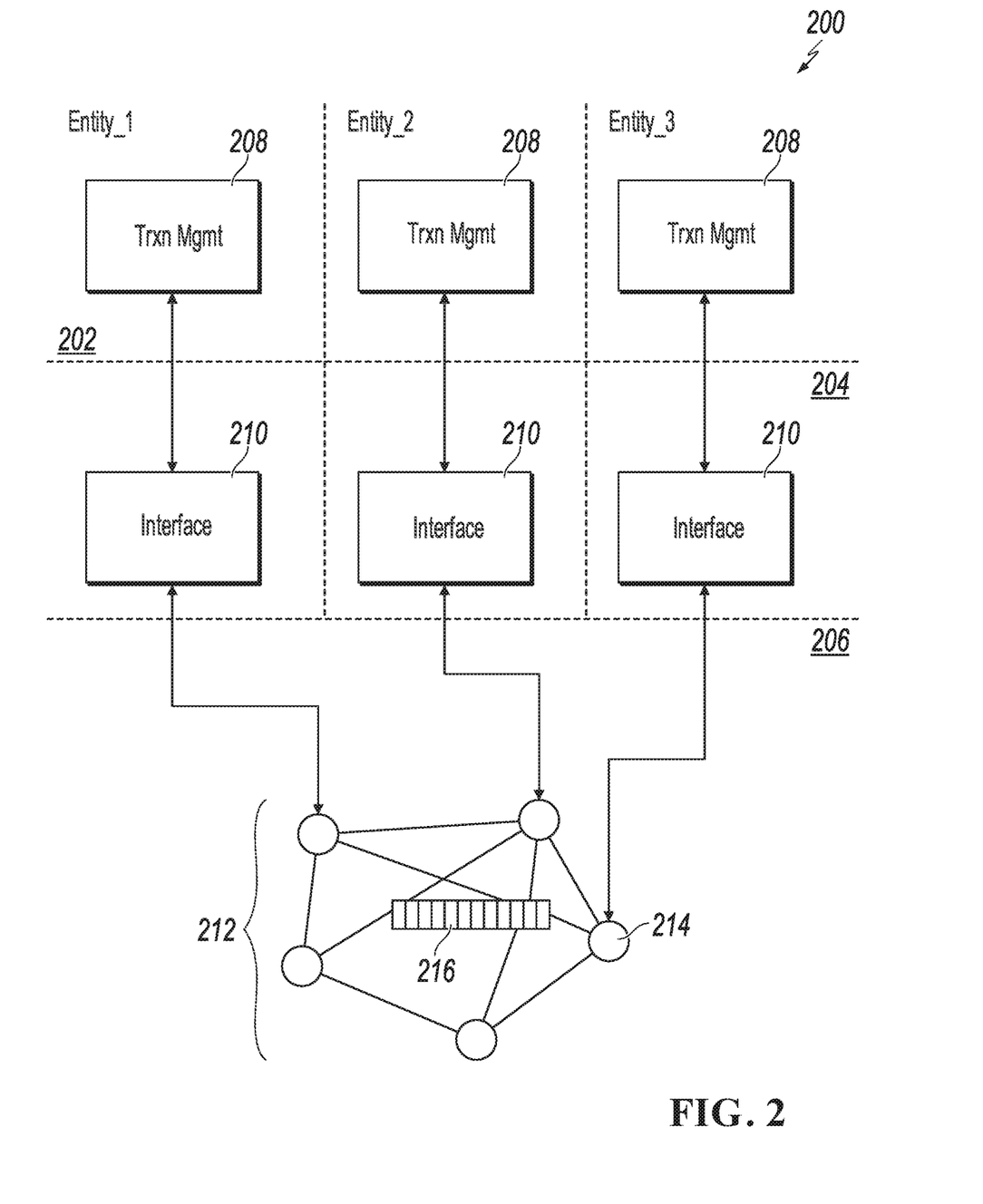
FIG. 2 depicts an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicates with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

Figure 3:
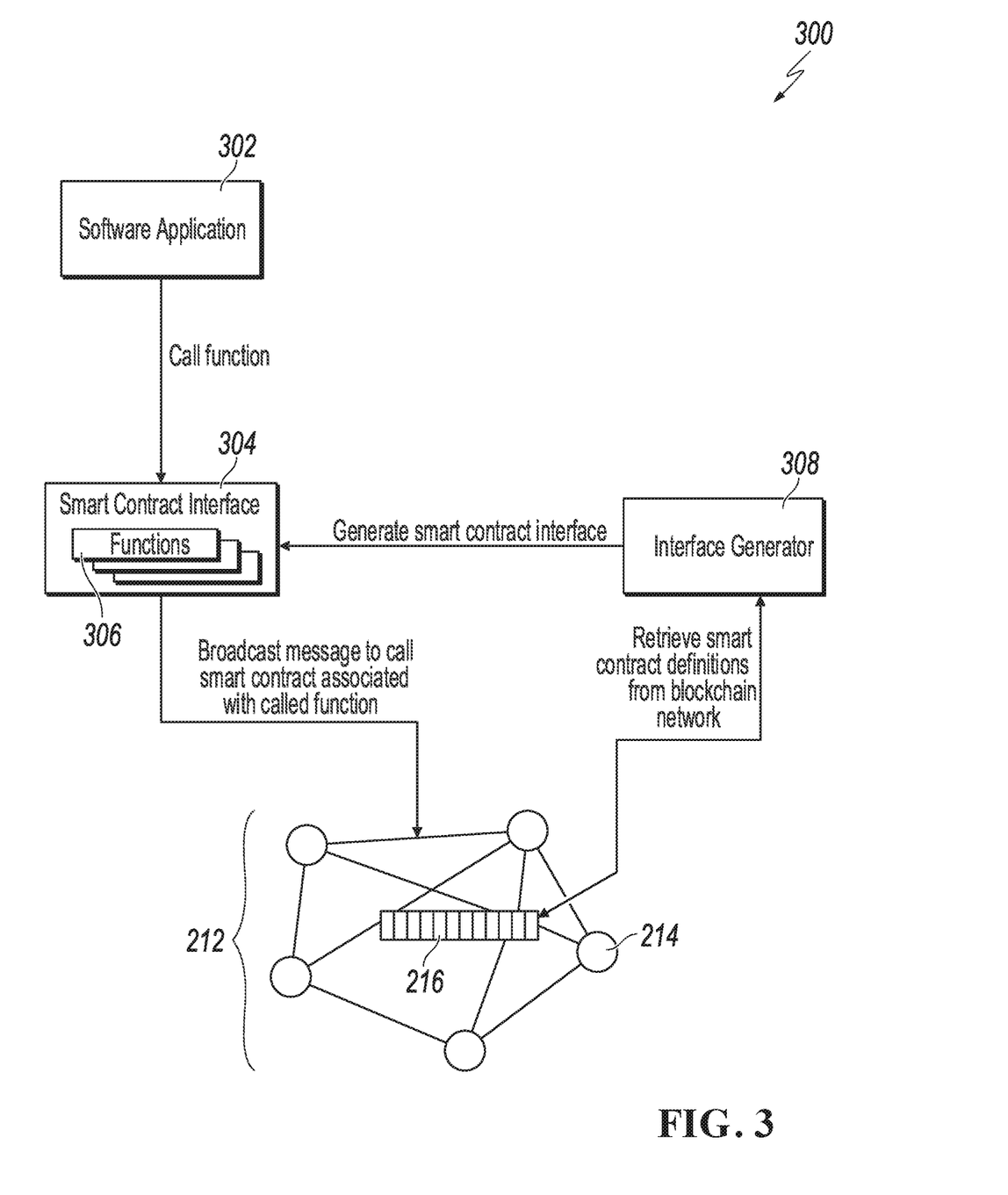
FIG. 3 depicts an example of an environment that can be used to generate the framework for executing smart contract calls.

FIG. 3 depicts an example of an environment 300 that can be used to generate the framework for executing smart contract calls. The environment 300 can include one or more software applications 302, a smart contract interface 304, an interface generator 308, a blockchain network 212, a plurality of nodes 214 of the blockchain network 212, and a single blockchain 216. The environment 300 can be implemented on a client device or across one or more computers connected locally or over the Internet.

In some implementations, the interface generator 308 communicates with the blockchain network 212. Upon powering on the client device, the interface generator 308 retrieves data from the blockchain network 212. For example, the interface generator 308 retrieves data representing one or more smart contracts, one or more definitions to call the smart contract from the blockchain network 212, one or more definitions to call functions of the smart contract from the blockchain network 212, and characteristics describing the blockchain network 212. The data representing one or more smart contracts can include a number of smart contracts and the type of smart contracts, for example. The characteristics can include a number of the plurality of nodes 214, the addresses of each of the nodes, and a ledger utilized by the plurality of nodes 214.

The interface generator 308 retrieves this information from the blockchain network 212 and in response, generates a smart contract interface 304 to provide to a developer for invoking smart contract calls in his/her respective application. The smart contract interface 304 can include, for example, one or more software libraries, a user interface, or a link to location of software function calls. The interface generator 308 loads the smart contract interface 304 with function definitions for the developer to use for instantiating smart contract calls in his/her own software, such as software application 302.

The smart contract interface 304, which can include one or more software libraries, for example, can allow a developer to call one or more functions of a smart contract found on the blockchain network 212. As such, the developer can interact with one or more smart contracts found on the blockchain network 212 by invoking one or more of the functions 306 of the smart contract interface 304.

A developer can incorporate one or more calls to the smart contract or calls to the functions of the smart contract in his/her software application 302. In particular, the software application 302 can be any application the developer desires, such as, for example, multimedia software, presentation software, simulation software, and software for engineering and product development, to name a few examples. Additionally, the software can be related to applications such as supply chain, eGoverment, gaming and gambling, banks and insurances, energy sector, IoT, digital identity, and legal technology, to name a few examples. The software application 302 can be written in C++, C, JavaScript, Python, Perl, or other software languages, to name a few examples.

In some implementations, the developer can incorporate calls of functions 306 to the smart contract interface 304 into the software application 302. For example, the developer can import a library of the smart contract interface 304, multiple libraries of the smart contract interface 304, or the smart contract interface 304 itself into the software application 302. By incorporating these libraries into the software application 302, the developer can invoke one or more of the functions provided by these libraries (e.g., the smart contract interface 304) at his/her desire. The developer can review the function definitions of the one or more functions 306 provided by the imported smart contract interface 304 to determine how to make a function call in his/her software application 302. Additionally, smart contract interface 304 can indicate how the developer can make a smart contract call located on the blockchain network 212.

The smart contract interface 304 can include a collection of class definitions corresponding to the functions 306. These class definitions show how a developer can invoke code in his/her software application 302 to call functions 306. For example, for a developer seeking to invoke a smart contract call, the developer does not have to analyze the smart contract on the blockchain network 212 to determine the parameters and the types of parameters required to generate the smart contract call. Rather, the developer can view the smart contract definition in the smart contract interface 304, such as through its header file, to determine how to invoke a smart contract call located on the blockchain network 212. Once the developer analyzes the smart contract definition in the smart contract interface 304, the developer can incorporate the smart contract definition as a function call in his/her software application to perform a desired function. For example, the smart contract interface 304 allows the developer, through the use of his/her software application 302, to perform a desired function that includes generating a new smart contract, creating one or more new functions/methods of a smart contract, calling a previously deployed smart contract on the blockchain network 212, and calling one or more functions/methods of a previously deployed smart contract on the blockchain network 302, to name a few examples.

In some implementations, a developer can create a smart contract in his/her software application 302 by interfacing with the smart contract interface 304. In particular, the interface 304 allows the developer to write software that performs a localized call to the smart contract interface 304 to execute one or more functions 306. For example, the one or more functions 306 can include calling a previously deployed smart contract that exists on the blockchain network 212, one or more functions of the smart contract found on the blockchain network 212, or invoking a new smart contract on the blockchain network 212. In some implementations, the blockchain network 212 can include multiple smart contracts, each with their own set of functions 306. The smart contract interface 304 allows the user to invoke each of the smart contracts found on the blockchain network 212 and each of the functions of each of the smart contracts.

As defined by the smart contract interface 304, each smart contract found on the blockchain network 212 can include a variable number of functions and/or methods that a developer can invoke. In order for a developer to access a previously deployed smart contract and its corresponding functions, a developer must provide inputs for a smart contract call. For example, the smart contract interface 304 can use an application binary interface (ABI) to make calls to the smart contract on the blockchain network 212, to communicate using functions of the smart contract on the blockchain network 212, and receive data from the smart contract. By utilizing ABI software, a developer can specify which function in the smart contract to invoke in his software application, as well as guarantee that the function will return data in the format the developer is expecting.

To perform a smart contract call, the user specifies the parameters of the smart contract in his/her software application 302. Smart contract parameters can have different data types. For example, the smart contract parameters can include cryptographic signatures, Boolean values, integer values, hash values, byte arrays, cryptographic keys, string values, data addresses, network addresses, port numbers, user identifiers, function identifiers, and other types of parameters.

In some implementations, the smart contract interface 304 assists developers with calling one or more functions 306. The smart contract interface 304 can pre-fill one or more inputs of a smart contract call from the software application 302. For example, a smart contract call may require a developer to enter five inputs: the inputs including a string type, an int type, a char type, an int type, and a char* type, as described by the function definition of this smart contract call. The smart contract interface 304 can indicate that the developer only is required to enter the string type and the char* type inputs. The string type can correspond to a name of the smart contract and the char* type corresponds to a buffer to be used store the data to be passed to the smart contract on the blockchain network 212. The smart contract interface 304 can fill in the remaining three inputs automatically.

In some implementations, the smart contract interface 304 may display a representational form of the definitions of the functions of the smart contract and the definitions of the one or more smart contracts to the developer. For example, the representational form can include an explain file, a header file, a library file for the developer to review, and a manual that instructs the developer on how to call the smart contract and its corresponding functions.

In some implementations, the smart contract interface 304 can perform parameter conversion on the parameters entered by the developer in the software application 302. The smart contract interface 304 converts the parameters input by the developer as defined by the function definitions in the header files, for example, to the required inputs for the call to the smart contract on the blockchain network 212. For example, the smart contract interface 304 can convert each of the String values or character values entered by the user on the interface 304 to the byte, u int8, and u_int32 values required by the input of the smart contract call. The smart contract interface 304 may perform parameter conversion to alleviate the number of inputs a developer is required to input in his/her software application 302. For example, the smart contract interface 304 may only require the developer to enter five inputs to make a call to a smart contract on the blockchain network 212. When the smart contract interface 304 receives the call with five inputs for the smart contract, the smart contract interface 304 may generate a new command to call the smart contract on the blockchain network 212. For example, the smart contract interface 304 transmit a function call to each node of the blockchain network with ten inputs. The additional five inputs can be standardized inputs that includes one or more addresses, port numbers, usernames, and other information pertaining to the smart contract call entered by the smart contract interface 304.

Additionally, the smart contract interface 304 can perform a table-look up to generate the smart contract call on the blockchain network 212 in response to receiving a call to the smart contract from the software application 302. For example, a developer can provide a smart contract call in the software application 302, and upon execution, the smart contract interface 304 can retrieve one or more parameters from a database required for the smart contract call to the blockchain network 212. This allows the developer to enter a minimal amount of parameters for the smart contract call in his/her software application 302, and not have to take any additional steps or add additional inputs. The developer does not have to deal with the difficulty of byte-aligning inputs, and ensuring that the correct inputs are provided for the smart contract call in the correct location.

The smart contract interface 304 can additionally perform compilation check and error checking on the execution of the software application 302. For example, the smart contract interface 304 can execute the code of the software application 302 and analyze each instruction. For example, for the instruction corresponding to the smart contract function call, the smart contract interface 304 can determine if the input types the user entered are correct, the spelling of each input is correct, and the number of inputs entered are correct. If the smart contract interface 304 determines the user entered an error on the input, the smart contract interface 304 can designate a notification to the developer to correct the error. Thus, the smart contract interface 304 can perform a first layer of error checking on the smart contract call before broadcasting the smart contract call to the blockchain network 212.

Additionally, the smart contract interface 304 allows the developer to enter his/her signature (e.g., his/her private key) before calling the blockchain network 212. The developer can enter his/her signature and public key through the client device when executing the software application 302. Additionally, the developer can enter his/her signature and public key as an input to the smart contract call in the software application 302. Alternatively, the developer's signature and public key can be appended to the end of the smart contract call to verify that the smart contract call comes from the developer with authenticated access to interact with the blockchain network 212 and subsequently, the smart contract. Additionally, the blockchain network 212 will verify the developer's signature and public key against the ledger of the blockchain network 212 to verify the authenticity of the developer.

In response to the smart contract interface 304 authenticating and compiling the developer's software application 302, the smart contract interface 304 generates the smart contract message to broadcast to the blockchain network 212. In particular, the smart contract interface 304 can package the parameters from the smart contract call in the software application 302 in a form acceptable by the blockchain network 212. For example, the information can be encoded in application binary interface (ABI) format for passing to a smart contract on the blockchain network. In particular, the smart contract interface 304 can generate a list of the functions and arguments in JavaScript Object Notation (JSON) format. The smart contract interface 304 can hash the data entered as a smart contract call in the software application 302 and data retrieved from a database to create a smart contract function call. The ABI format allows the smart contract interface 304 to encode a meaningful format for the smart contract call at the blockchain network 212 to understand the call at the byte level. Additionally, the blockchain network 212 can receive the data from the previously deployed smart contract in ABI format.

The smart contract interface 304 provides the smart contract call to the blockchain network 212. In particular, the smart contract interface 304 broadcasts the smart contract call to each node of the plurality of nodes 214 on the blockchain network 212. Each node in the plurality of nodes 214 on the blockchain network 212 performs a hash calculation to verify the authenticity of the smart contract call from the smart contract interface 304. In particular, each node verifies that the developer that is requesting for the smart contract call corresponds to the developer's signature (e.g., private key) and the developer's public key found in the smart contract call.

Additionally, each node in the plurality of nodes 214 verifies that the developer is authenticated to communicate with the particular previously deployed smart contract or is able to generate a new smart contract. In particular, each node compares the developer's signature to the ledger found at each node. If each node authenticates the developer's signature and authenticates that the developer is able to communicate with the previously deployed smart contract or is able to generate a new smart contract, each node communicates a success to one another. In particular, each of the nodes transmit an acceptance for the received smart contract call to each of the other nodes. Alternatively, if at least one of the nodes determine an error exists with the data found in the smart contract call, that one node can notify all the other nodes that an error exists with the smart contract call. Then, the blockchain network 212 can notify the smart contract interface 304 that an error exists in the smart contract call. The smart contract interface 304 can transmit a notification to the developer's client device notifying the developer of the error.

Should the plurality of nodes transmit an acceptance for the received smart contract call to each of the other nodes, then each of the nodes performs the function requested for by the smart contract interface 304. The function can include, executing a function/method for a previously deployed smart contract, generating a new smart contract, or calling a previously deployed smart contract. For example, in response to each of the nodes of the plurality of nodes accepting the received smart contract call, each node of the blockchain network 212 executes the smart contract call in a consensus fashion. Each node in the blockchain network executes a first instruction of the smart contract call. As previously described, the first node in the blockchain network that finishes executing the first instruction writes a result of the execution of the first instruction in memory of the blockchain network 212. The other nodes in the blockchain network can verify the result of the first node's execution of the first instruction. If each of the nodes verify the result then each node proceeds to execute the second instruction of the smart contract call. This process repeats until each instruction of the smart contract call is executed and verified by each of the nodes. This consensus verification across the plurality of nodes 214 ensures that the results of the smart contract call are verified by each node in the blockchain network 212.

In response to the plurality of nodes 214 performing consensus verification on the results of the smart contract call, the blockchain network 212 can transmit the results of the smart contract call back to the smart contract interface 304. For example, the results of the smart contract call can indicate that a new smart contract was created and stored on the blockchain network 212. In another example, the results of the smart contract call can indicate that a function of a previously deployed smart contract on the blockchain network 212 has executed, such as transferring money from a first node to a second node. In another example, the results of the smart contract call can indicate that a change of ownership in a product, such as a vehicle or house, has transferred rights to one user from a different user. The smart contract interface 304 can display the results to the developer on a display of the client device. The developer can view the results of the executed software application 302 and proceed to execute another software application 302 or power down the system.

Figure 4:
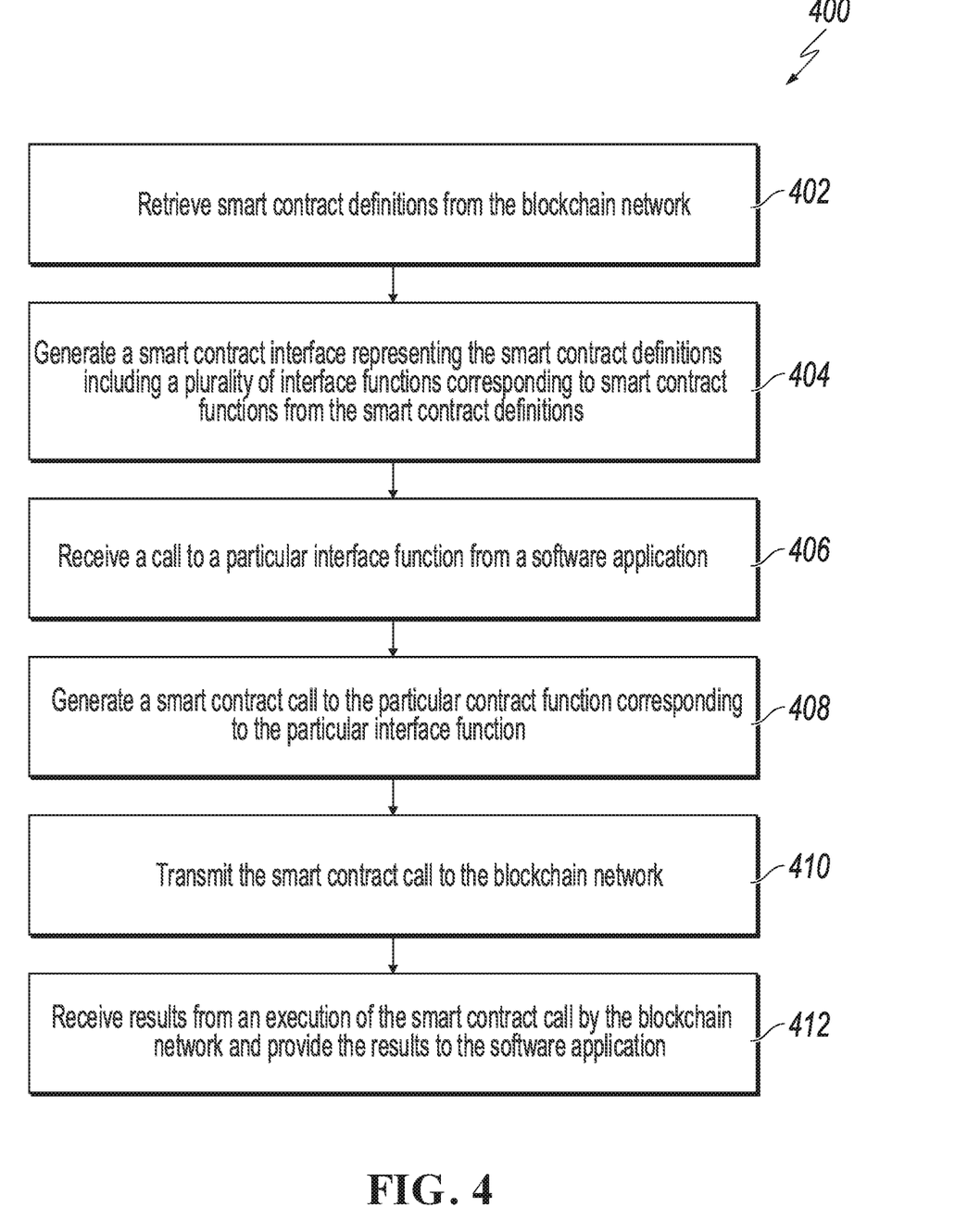
FIG. 4 depicts an example of a process that can be executed in accordance with implementations of this specification.

FIG. 4 depicts an example of a process 400 that can be executed in accordance with implementations of this specification. In some implementations, the process 400 may be performed using one or more computer-executable programs executed using one or more computing devices.

At 402, smart contract definitions are retrieved from the blockchain network, the smart contract definitions including a plurality of contract functions from a plurality of smart contracts stored in a blockchain maintained by the blockchain network. In examples, the smart contract definition is an entry in the blockchain including software instructions to be executed by the blockchain network when the smart contract is called, for example by a client, user, or a blockchain node of the blockchain network. The smart contract definition can also include functions definitions that define the various ways a smart contract can be called (e.g., a smart contract function called "pay( )" that takes two account addresses as parameters). The functions include one or more software instructions to be executed by the blockchain network when the function is called. In some cases, the one or more software instruction in the smart contract definitions can be represented as bytecode associated with a specific programming language. In some cases, retrieving the smart contract definitions includes retrieving the bytecode associated with smart contracts stored in the blockchain.

At 404, a smart contract interface is generated based on the smart contract definitions. The smart contract interface can include a plurality of interface functions corresponding to the plurality of contract functions. The smart contract interface can be configured to allow software applications to call each of the contract functions by calling a corresponding interface function. In some cases, generating a smart contract call to the particular contract function including the call parameters includes retrieving the call parameters from the call to the interface function; and converting the call parameters to smart contract parameters for communicating with the corresponding smart contract on the blockchain network. In some implementations, retrieving smart contract definitions and generating the smart contract interface are performed automatically in response to a change to the smart contract definitions stored in the blockchain.

At 406, a call to a particular interface function is received from a software application, the call including call parameters corresponding to parameters of a particular contract function corresponding to the particular interface function.

At 408, in response to the receiving the call to the particular interface function, a smart contract call to the particular contract function including the call parameters is generated. In some cases, each call parameter has a parameter type matching a contract parameter type of a corresponding parameter of the particular contract function. The parameter type can include at least one of an integer, a string, or a byte array.

At 410, the smart contract call is transmitted to the blockchain network. In some cases, the smart contract call can be broadcast over a network to nodes of the blockchain network.

In some cases, results from an execution of the smart contract call by the blockchain network are received and provided to the software application.

Figure 5:
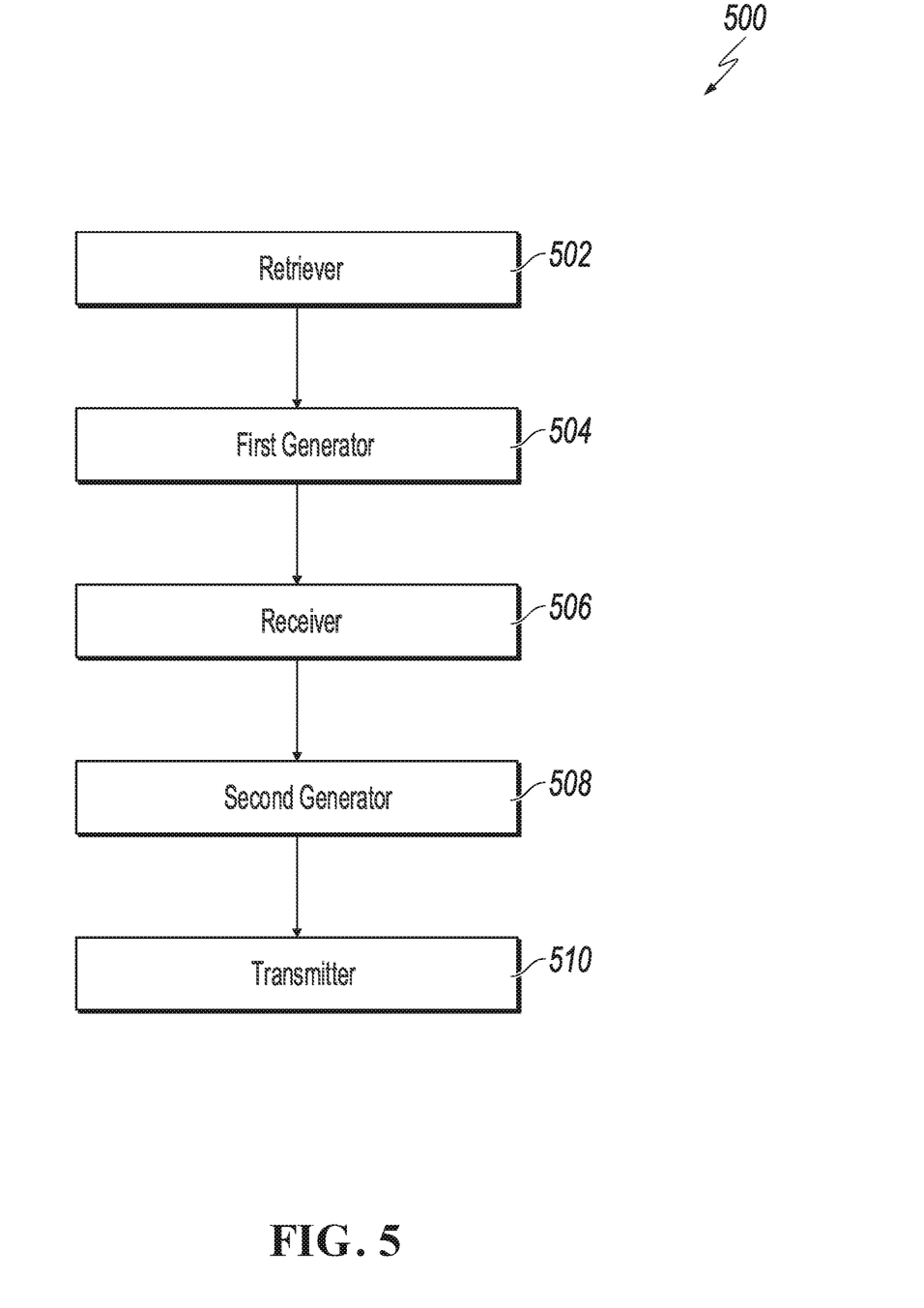
FIG. 5 depicts examples of modules of an apparatus in accordance with implementations of this specification.

FIG. 5 depicts examples of modules of an apparatus 500 in accordance with implementations of this specification. The apparatus 500 can be an implementation of a software process configured to implement a smart contract call on a blockchain network, such as a consortium blockchain network. The apparatus 500 can correspond to the implementations described above, and the apparatus 500 includes the following: a retriever or retrieving module 502 for retrieving smart contract definitions from the blockchain network, the smart contract definitions including a plurality of contract functions from a plurality of smart contracts stored in a blockchain maintained by the blockchain network; a first generator or first generating module 504 for generating a smart contract interface representing the smart contract definitions, the smart contract interface including a plurality of interface functions corresponding to the plurality of contract functions, the smart contract interface configured to allow software applications to call each of the contract functions by calling a corresponding interface function; a receiver or receiving module 506 for receiving a call to a particular interface function from a software application, the call including call parameters corresponding to parameters of a particular contract function corresponding to the particular interface function; a second generator or generating module 508 for generating a smart contract call to the particular contract function including the call parameters in response to the receiving the call to the particular interface function; a transmitter or transmitting module 510 for transmitting the smart contract call to the blockchain network.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of this specification without creative efforts.

Referring again to FIG. 5, it can be interpreted as illustrating an internal functional module and a structure of a software process configured to implement a smart contract call on a blockchain network. An execution body in essence can be an electronic device, and the electronic device includes the following: one or more processors; and a memory storing an executable instruction of the one or more processors.

The techniques described in this specification produce one or more technical effects. In some embodiments, by automatically generating a software interface library for smart contracts in a blockchain, the techniques produce an up-to-date definition of the smart contracts and smart contract functions available to be executed. In other embodiments, software applications using this generated library will make fewer erroneous calls to smart contracts and functions (e.g., calls to functions that do not exist, invalid parameters, etc.). Because such erroneous calls lead to additional overhead in both the blockchain network and the device executing the software application making the erroneous call (e.g., by handling the error, handling retries of the failed call, etc.), the reduction or elimination of these erroneous calls by the software interface library can lead to increased efficiency and greater performance in both the calling device and the blockchain network.

Described embodiments of the subject matter can include one or more features, alone or in combination.

For example, in some embodiments, actions include retrieving smart contract definitions from the blockchain network, the smart contract definitions including a plurality of contract functions from a plurality of smart contracts stored in a blockchain maintained by the blockchain network; generating a smart contract interface representing the smart contract definitions, the smart contract interface including a plurality of interface functions corresponding to the plurality of contract functions, the smart contract interface configured to allow software applications to call each of the contract functions by calling a corresponding interface function; receiving a call to a particular interface function from a software application, the call including call parameters corresponding to parameters of a particular contract function corresponding to the particular interface function; in response to the receiving the call to the particular interface function, generating a smart contract call to the particular contract function including the call parameters; transmitting the smart contract call to the blockchain network; and receiving results from an execution of the smart contract call by the blockchain network and providing the results to the software application.

Other implementations include corresponding systems, apparatus, and computer programs, configured to perform the actions of the methods, encoded on computer storage devices.

The foregoing and other described embodiments can each, optionally, include one or more of the following features:

In some embodiments, retrieving the smart contract definitions includes retrieving bytecode associated with smart contracts stored in the blockchain.

In some embodiments, generating a smart contract call to the particular contract function including the call parameters includes retrieving the call parameters from the call to the interface function; and converting the call parameters to smart contract parameters for communicating with the corresponding smart contract on the blockchain network.

In some embodiments, each call parameters has a parameter type matching a contract parameter type of a corresponding parameter of the particular contract function.

In some embodiments, the parameter type includes at least of an integer, a string, or a byte array.

In some embodiments, transmitting the smart contract call to the blockchain network comprises broadcasting the smart contract call to a plurality of nodes of the blockchain network.

In some embodiments, retrieving smart contract definitions and generating the smart contract interface are performed automatically in response to a change to the smart contract definitions stored in the blockchain.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for implementing a smart contract call on a blockchain network, the method comprising:
retrieving one or more smart contract definitions from the blockchain network, the one or more smart contract definitions including a plurality of contract functions from a plurality of smart contracts stored in a blockchain maintained by the blockchain network;
generating a smart contract interface representing the one or more smart contract definitions, the smart contract interface including a plurality of interface functions corresponding to the plurality of contract functions, the smart contract interface configured to allow developer software applications to call each of the contract functions by calling a corresponding interface function;
receiving a local call to a particular interface function from a developer software application, the local call including call parameters corresponding to parameters of a particular contract function corresponding to the particular interface function;
in response to the receiving the local call to the particular interface function, (i) retrieving, from the local call, the call parameters, (ii) converting, using a software library, the call parameters to smart contract parameters for communicating with a corresponding smart contract on the blockchain network, and (iii) generating a smart contract call to the particular contract function, the smart contract call including the smart contract parameters; and
transmitting the smart contract call to the blockchain network.

2. The method of claim 1, further comprising receiving results from an execution of the smart contract call by the blockchain network and providing the results to the developer software application.

3. The method of claim 1, wherein retrieving the one or more smart contract definitions includes retrieving bytecode associated with smart contracts stored in the blockchain.

4. The method of claim 1, wherein each call parameter has a parameter type matching a contract parameter type of a corresponding smart contract parameter of the particular contract function.

5. The method of claim 4, wherein the parameter type includes at least of an integer, a string, or a byte array.

6. The method of claim 1, wherein transmitting the smart contract call to the blockchain network comprises broadcasting the smart contract call to a plurality of nodes of the blockchain network.

7. The method of claim 1, wherein retrieving the one or more smart contract definitions and generating the smart contract interface are performed automatically in response to a change to the one or more smart contract definitions stored in the blockchain.

8. A non-transitory, computer-readable storage medium storing one or more instructions executable by a computer system to perform operations comprising:
retrieving one or more smart contract definitions from a blockchain network, the one or more smart contract definitions including a plurality of contract functions from a plurality of smart contracts stored in a blockchain maintained by a blockchain network;
generating a smart contract interface representing the one or more smart contract definitions, the smart contract interface including a plurality of interface functions corresponding to the plurality of contract functions, the smart contract interface configured to allow developer software applications to call each of the contract functions by calling a corresponding interface function;
receiving a local call to a particular interface function from a developer software application, the local call including call parameters corresponding to parameters of a particular contract function corresponding to the particular interface function;
in response to the receiving the local call to the particular interface function, (i) retrieving, from the local call, the call parameters, (ii) converting, using a software library, the call parameters to smart contract parameters for communicating with a corresponding smart contract on the blockchain network, and (iii) generating a smart contract call to the particular contract function, the smart contract call including the smart contract parameters; and
transmitting the smart contract call to the blockchain network.

9. The non-transitory, computer-readable storage medium of claim 8, the operations further comprising receiving results from an execution of the smart contract call by the blockchain network and providing the results to the developer software application.

10. The non-transitory, computer-readable storage medium of claim 8, wherein retrieving the one or more smart contract definitions includes retrieving bytecode associated with smart contracts stored in the blockchain.

11. The non-transitory, computer-readable storage medium of claim 8, wherein each call parameter has a parameter type matching a contract parameter type of a corresponding smart contract parameter of the particular contract function.

12. The non-transitory, computer-readable storage medium of claim 11, wherein the parameter type includes at least of an integer, a string, or a byte array.

13. The non-transitory, computer-readable storage medium of claim 8, wherein transmitting the smart contract call to the blockchain network comprises broadcasting the smart contract call to a plurality of nodes of the blockchain network.

14. The non-transitory, computer-readable storage medium of claim 8, wherein retrieving the one or more smart contract definitions and generating the smart contract interface are performed automatically in response to a change to the one or more smart contract definitions stored in the blockchain.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
retrieving one or more smart contract definitions from a blockchain network, the one or more smart contract definitions including a plurality of contract functions from a plurality of smart contracts stored in a blockchain maintained by a blockchain network,
generating a smart contract interface representing the one or more smart contract definitions, the smart contract interface including a plurality of interface functions corresponding to the plurality of contract functions, the smart contract interface configured to allow developer software applications to call each of the contract functions by calling a corresponding interface function, receiving a local call to a particular interface function from a developer software application, the local call including call parameters corresponding to parameters of a particular contract function corresponding to the particular interface function, in response to the receiving the local call to the particular interface function, (i) retrieving, from the local call, the call parameters, (ii) converting, using a software library, the call parameters to smart contract parameters for communicating with a corresponding smart contract on the blockchain network, and (iii) generating a smart contract call to the particular contract function, the smart contract call including the smart contract parameters, and transmitting the smart contract call to the blockchain network.

16. The system of claim 15, wherein the operations further comprise receiving results from an execution of the smart contract call by the blockchain network and providing the results to the developer software application.

17. The system of claim 15, wherein retrieving the one or more smart contract definitions includes retrieving bytecode associated with smart contracts stored in the blockchain.

18. The system of claim 15, wherein each call parameter has a parameter type matching a contract parameter type of a corresponding smart contract parameter of the particular contract function.

19. The system of claim 18, wherein the parameter type includes at least of an integer, a string, or a byte array.

20. The system of claim 15, wherein transmitting the smart contract call to the blockchain network comprises broadcasting the smart contract call to a plurality of nodes of the blockchain network.

21. The system of claim 15, wherein retrieving the one or more smart contract definitions and generating the smart contract interface are performed automatically in response to a change to the one or more smart contract definitions stored in the blockchain.

22. The method of claim 1, wherein converting the call parameters to smart contract parameters comprises at least one of:
    converting a string value or a character value to corresponding numerical values, or
    generating a second number of the smart contract parameters from a first number of the call parameters, wherein the second number is larger than the first number.

23. The method of claim 1, further comprising:
    performing an error check on execution of the developer software application prior to transmitting the smart contract call to the blockchain network.

* * * * *

UNITED STATES PATENT AND TRADEMARK OFFICE
CERTIFICATE OF CORRECTION

PATENT NO. : 10,812,255 B2  
APPLICATION NO. : 16/587371  
DATED : October 20, 2020  
INVENTOR(S) : Yanpeng Li Page 1 of 1

It is certified that error appears in the above-identified patent and that said Letters Patent is hereby corrected as shown below:

In the Claims

Column 17, Line 48, in Claim 5, after "least" insert -- one --, therefor.

Column 18, Line 38, in Claim 12, after "least" insert -- one --, therefor.

Column 20, Line 6, in Claim 19, after "least" insert -- one --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*